US012701463B2

(12) United States Patent
Lyu et al.

(10) Patent No.: US 12,701,463 B2
(45) Date of Patent: Aug. 4, 2026

(54) METHOD AND DEVICE FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 357 days.

(21) Appl. No.: 18/452,377

(22) Filed: Aug. 18, 2023

(65) Prior Publication Data

US 2023/0397045 A1     Dec. 7, 2023

Related U.S. Application Data

(63) Continuation of application No. PCT/CN2022/095232, filed on May 26, 2022.

(51) Int. Cl.
*H04W 28/06* (2009.01)
*H04W 76/20* (2018.01)

(52) U.S. Cl.
CPC ........... *H04W 28/06* (2013.01); *H04W 76/20* (2018.02)

(58) Field of Classification Search
None
See application file for complete search history.

(56) References Cited

U.S. PATENT DOCUMENTS

| | | | | |
|---|---|---|---|---|
| 2013/0229906 A1* | 9/2013 | Akkarakaran | ........ | H04W 28/04 370/216 |
| 2015/0257026 A1* | 9/2015 | Muttik | .............. | H04W 28/0226 370/252 |
| 2016/0014037 A1 | 1/2016 | Hu et al. | | |
| 2017/0099660 A1 | 4/2017 | Oh | | |
| 2025/0176061 A1* | 5/2025 | Wu | ........................ | H04W 76/30 |
| 2025/0254750 A1* | 8/2025 | Mu | ........................ | H04W 8/24 |

FOREIGN PATENT DOCUMENTS

| | | |
|---|---|---|
| CN | 102271367 | 12/2011 |
| CN | 106658601 | 5/2017 |
| CN | 109088829 A | 12/2018 |
| CN | 109845378 A | 6/2019 |

(Continued)

OTHER PUBLICATIONS

3GPP TR 22.891 V14.2.0, "3rd Generation Partnership Project; Technical Specification Group Services and System Aspects; Feasibility Study on New Services and Markets Technology Enablers; Stage 1 (Release 14)," Sep. 2016, 95 pages.

(Continued)

*Primary Examiner* — Eunsook Choi
(74) *Attorney, Agent, or Firm* — Fish & Richardson P.C.

(57) ABSTRACT

A wireless communication method and device are provided according to the present disclosure. An example method includes: sending, at a terminal device and by using small data transmission (SDT) resources, data to a network device, wherein using the SDT resources to send the data is determined based on first information; wherein the first information includes one or more of the following information: a size of the data, an allowable transmission latency of the data, or a waiting time of the data.

14 Claims, 3 Drawing Sheets

100

120

110

120

(56) References Cited

FOREIGN PATENT DOCUMENTS

| | | | |
|----|----------------|----|---------|
| CN | 109981483 | A | 7/2019 |
| CN | 112087398 | A | 12/2020 |
| CN | 113366797 | A | 9/2021 |
| CN | 113906790 | | 1/2022 |
| CN | 114071509 | A | 2/2022 |
| CN | 114080037 | | 2/2022 |
| CN | 114189948 | | 3/2022 |
| CN | 114205921 | A | 3/2022 |
| CN | 114258159 | | 3/2022 |
| CN | 114374495 | A | 4/2022 |
| CN | 114390557 | A | 4/2022 |
| IN | 202037034696 | A | 9/2020 |
| WO | WO 2009079842 | A1 | 7/2009 |
| WO | WO 2021207317 | A1 | 10/2021 |
| WO | WO 2022077286 | A1 | 4/2022 |

OTHER PUBLICATIONS

International Search Report and Written Opinion in International Appln. No. PCT/CN2022/095232, mailed on Feb. 23, 2023, 23 pages (with English machine translation).

Xiaomi, "2-step RACH and 4-step RACH selection criteria for SDT," 3GPP TSG-RAN WG2 Meeting #112e, R2-2010232, E-Meeting, Nov. 2-13, 2020, 2 pages.

Office Action in Chinese Appln. No. 202280002806.7, mailed on May 31, 2024, 25 pages (with machine English translation).

Office Action in Chinese Appln. No. 202280002806.7, mailed on Nov. 13, 2024, 24 pages (with machine English translation).

* cited by examiner

100

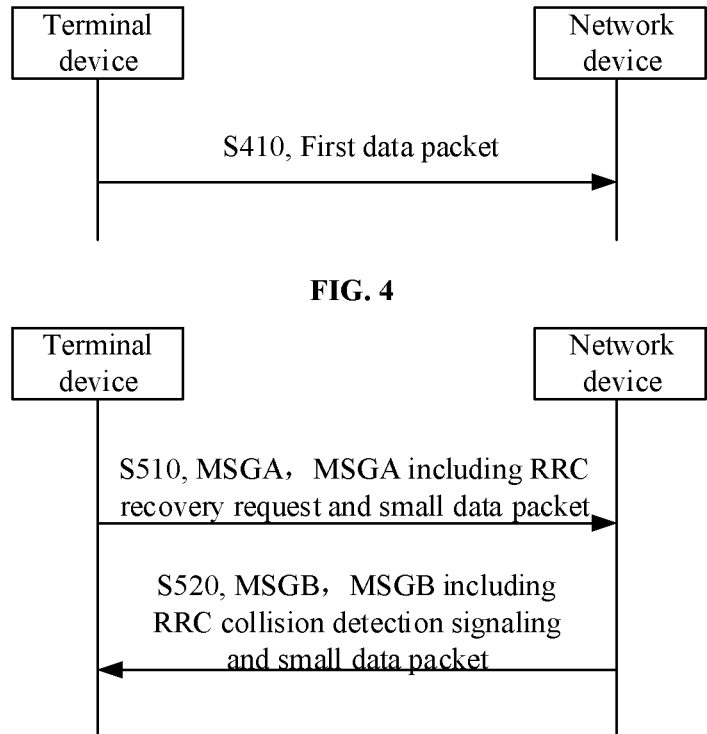
FIG. 4
FIG. 5
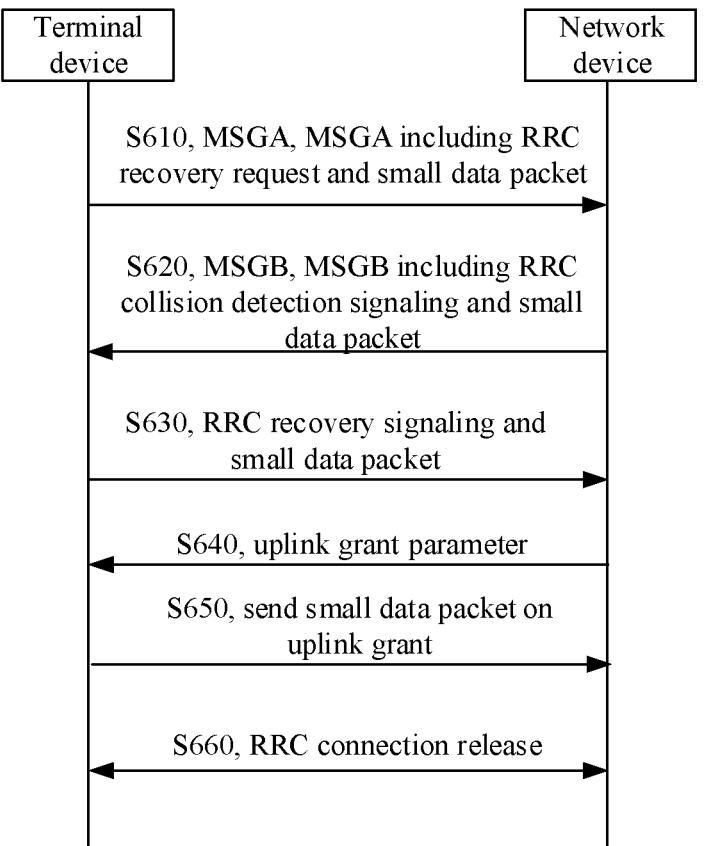
FIG. 6

METHOD AND DEVICE FOR WIRELESS COMMUNICATION

CROSS REFERENCE TO RELATED APPLICATIONS

The present application is a continuation of PCT Patent Application No. PCT/CN2022/095232, entitled "METHOD AND DEVICE FOR WIRELESS COMMUNICATION," filed May 26, 2022, the disclosure of which is hereby incorporated by reference in its entirety.

TECHNICAL FIELD

The present application relates to the technical field of communication, and in particular to a method and a device for wireless communication.

BACKGROUND

In order to save signaling overhead of a terminal device, the terminal device is allowed to perform small data transmission (SDT) in the radio resource control inactive (RRC_INACTIVE) state in a communication system, that is, the terminal device is allowed to use SDT resources to transmit small data packets. However, the amount of data that SDT resources carry is usually limited. If there are multiple data packets to be transmitted in the terminal device, there is no clear regulation on how the terminal device chooses the data packets to be transmitted.

SUMMARY

In view of the above problems, a method and a device for wireless communication are provided according to embodiments of the present disclosure. Various aspects involved in the embodiments of the present disclosure are described below.

In a first aspect, a method for wireless communication is provided, including: sending, at a terminal device and by using SDT resources, a first data packet among data packets to be transmitted to a network device, where the first data packet is determined based on first information; the first information includes one or more of the following information: sizes of the data packets to be transmitted, allowable transmission latencies of the data packets to be transmitted, waiting time of the data packets to be transmitted.

In a second aspect, a method for wireless communication is provided, including: receiving, at a network device and by using SDT resources, a first data packet among data packets to be transmitted sent by a terminal device, where the first data packet is determined based on first information; the first information includes one or more of the following information: sizes of the data packets to be transmitted, allowable transmission latencies of the data packets to be transmitted, waiting time of the data packets to be transmitted.

In a third aspect, a terminal device is provided, including: a sending unit configured to send, by using SDT resources, a first data packet among data packets to be transmitted to a network device, where the first data packet is determined based on first information; the first information includes one or more of the following information: sizes of the data packets to be transmitted, allowable transmission latencies of the data packets to be transmitted, waiting time of the data packets to be transmitted.

In a fourth aspect, a network device is provided, including: a receiving unit configured to receive, by using SDT resources, a first data packet among data packets to be transmitted sent by a terminal device, where the first data packet is determined based on first information; the first information includes one or more of the following information: sizes of the data packets to be transmitted, allowable transmission latencies of the data packets to be transmitted, waiting time of the data packets to be transmitted.

In a fifth aspect, a terminal device is provided, including: a processor, a memory and a communication interface, the memory being configured to store one or more computer programs, and the processor being configured to call the one or more computer programs in the memory to cause the terminal device to implement the method described in the first aspect.

In a sixth aspect, a network device is provided, including: a processor, a memory and a communication interface, the memory being configured to store one or more computer programs, and the processor being configured to call the one or more computer programs in the memory to cause the network device to implement the method described in the second aspect.

In a seventh aspect, a device is provided, including a processor configured to call a program from a memory to implement the method described in the first aspect.

In an eighth aspect, a device is provided, including a processor configured to call a program from a memory to implement the method described in the second aspect.

In a ninth aspect, a chip is provided, including a processor configured to call a program from a memory, to cause a device installed with the chip to implement the method described in the first aspect.

In a tenth aspect, a chip is provided, including a processor configured to call a program from a memory, to cause a device installed with the chip to implement the method described in the second aspect.

In an eleventh aspect, a computer readable storage medium is provided, on which a program is stored, the program causing a computer to implement the method described in the first aspect.

In a twelfth aspect, a computer readable storage medium is provided, on which a program is stored, the program causing a computer to implement the method described in the second aspect.

In a thirteenth aspect, a computer program product is provided, including a program that causes a computer to perform the method described in the first aspect.

In a fourteenth aspect, a computer program product is provided, including a program that causes a computer to perform the method described in the second aspect.

In a fifteenth aspect, a computer program is provided and causes a computer to implement the method of the first aspect.

In a sixteenth aspect, a computer program is provided and causes a computer to implement the method of the second aspect.

In the embodiments of the present disclosure, the terminal device is configured to select the first data packet to be sent to the network device based on the first information, thereby clarifying the selection strategy for small data packets and also helping to transmit small data packets reasonably and maximally.

BRIEF DESCRIPTION OF THE DRAWINGS

FIG. 4 is a schematic flowchart of a wireless communication method provided by an embodiment of the present disclosure.

FIG. 5 is a schematic flowchart of a method for transmitting small data packets provided by another embodiment of the present disclosure.

FIG. 6 is a schematic flowchart of a method for transmitting small data packets provided by another embodiment of the present disclosure.

DETAILED DESCRIPTION OF THE EMBODIMENTS

Hereinafter, the technical solution in this disclosure is described with reference to the drawings.

Figure 1:
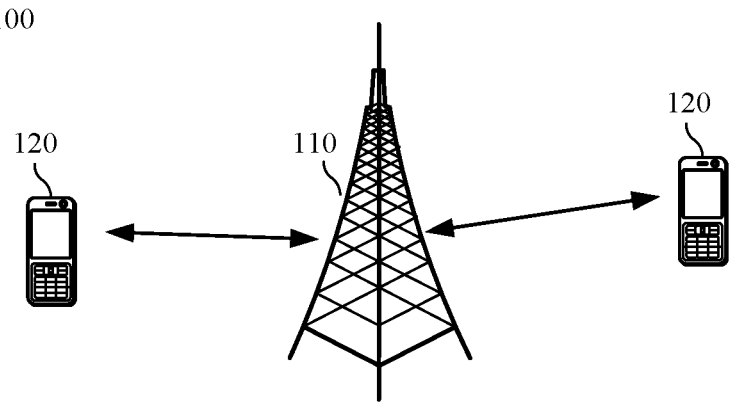
FIG. 1 is an example system architecture diagram of a communication system applicable to an embodiment of the present disclosure.

FIG. 1 is a wireless communication system 100 applied in an embodiment of the present disclosure. The wireless communication system 100 may include a network device 110 and terminal devices 120. The network device 110 may be a device that communicates with the terminal devices 120. The network device 110 may provide communication coverage for a specific geographical area and may communicate with the terminal devices 120 located in the coverage area.

FIG. 1 schematically shows one network device and two terminal devices. In an embodiment, the wireless communication system 100 may include multiple network devices and each network device may include other numbers of terminal devices within its coverage range, which is not limited by the embodiment of this disclosure.

In an embodiment, the wireless communication system 100 may further include other network entities such as a network controller and a mobility management entity, which is not limited by the embodiment of the present disclosure.

It should be understood that the technical solution of the embodiment of the present disclosure may be applied to various communication systems, such as the 5th generation (5G) system or new radio (NR), long term evolution (LTE) system, frequency division duplex (FDD) system, time division duplex (TDD) system, etc. The technical solution provided by the present disclosure may also be applied to future communication systems, such as the sixth generation mobile communication system, and satellite communication system, etc.

The terminal device in the embodiments of the present disclosure may also be called user equipment (UE), access terminal, user unit, user station, mobile station (MS), mobile Terminal (MT), remote station, remote terminal, mobile device, user terminal, terminal, wireless communication device, user agent or user device. The terminal device in the embodiment of the present disclosure may be a device that provides voice and/or data connectivity to users, and may be used to connect people, things and machines, such as handheld devices with wireless connection function, vehicle-mounted devices and the like. The terminal device in the embodiment of the present disclosure may be a mobile phone, a tablet computer (Pad), a notebook computer, a palmtop computer, a mobile internet device (MID), a wearable device, a virtual reality (VR) device, an augmented reality (AR) device, wireless terminals in industrial control, wireless terminals in self driving, wireless terminals in remote medical surgery, wireless terminals in smart grid, wireless terminals in transportation safety, wireless terminals in smart city, wireless terminals in smart home, etc. In an embodiment, the UE may be used to act as a base station. For example, a UE may act as a scheduling entity that provides a lateral link signal between UEs in vehicle-to-everything (V2X) or Device-to-Device (D2D), etc. For example, a cellular phone and a car communicate with each other using lateral link signals. The communication between the cellular phone and the smart home device is through the lateral link signals, without relaying communication signals through the base station.

The network device in the embodiments of the present disclosure may be a device for communicating with a terminal device. The network device may also be called an access network device or a wireless access network device, for example, the network device may be a base station. The network device in the embodiments of the present disclosure may refer to a radio access network (RAN) node (or device) that connects a terminal device to a wireless network. The base station may broadly cover or replace the following names, such as Node B (NodeB), evolved NodeB (eNB), next generation base station (next generation NodeB, gNB), Relay Station, Access Point, transmitting and receiving point (TRP), a transmitting point (TP), a main station (MeNB), an auxiliary station (SeNB), a multi-standard wireless (MSR) node, a home base station, a network controller, an access node, a wireless node, an access piont (AP), a transmission node, a transceiver node, a base band unit (BBU), radio Remote Radio Unit (RRU), active antenna unit (AAU), remote radio head (RRH), central unit (CU), distributed unit (DU), positioning node, etc. The base station may be a macro base station, a micro base station, a relay node, a donor node, or similar, or a combination thereof. The base station may also refer to a communication module, a modem or a chip used to be arranged in the aforementioned devices or apparatuses. The base station may also be a mobile switching center, as well as devices that assume the functions of the base station in device-to-device (D2D), vehicle-to-everything (V2X) and machine-to-machine (M2M) communication, network side devices in 6G networks, devices responsible for base station functions in future communication systems, etc. The base station may support networks with the same or different access technologies. The embodiments of the present disclosure do not limit the specific technology and the specific device form adopted by the network device.

The base station may be fixed or mobile. For example, a helicopter or drone may be configured to act as a mobile base station, and one or more cells may move according to the location of the mobile base station. In other examples, a helicopter or drone may be configured to be configured as a device for communicating with another base station.

In some deployments, the network device in the embodiments of the present disclosure may refer to CU or DU, or the network device includes CU and DU. gNB may also include AAU.

Network devices and terminal devices may be deployed on land, including indoor or outdoor, handheld or vehicular; they may also be deployed on the water surface; they may also be deployed on airplanes, balloons, and satellites in the air. In the embodiments of the present disclosure, there is no limitation to the scene where the network device and the terminal device are located.

It should be understood that all or part of the functions of the communication device in the present disclosure may also be realized by software functions running on hardware, or by virtualization functions instantiated on a platform (such as a cloud platform).

At present, three radio resource control (RRC) states of a terminal device are defined in the 3rd Generation Partnership Project (3GPP) protocol: RRC_CONNECTED state, RRC_IDLE state and RRC_INACTIVE state.

The RRC_CONNECTED state may refer to a state in which the terminal device is not released after completing the random access procedure. There is an RRC connection between the terminal device and the network device (such as an access network device). In the RRC_CONNECTED state, data may be transmitted between the terminal device and the network device, such as downlink data transmission and/or uplink data transmission. Alternatively, the terminal device and the network device can also transmit data of a specific data channel and/or control channel of the terminal device to transmit specific information or unicast information of the terminal device.

The RRC_IDLE state refers to a state in which the terminal device resides in the cell, but does not perform random access. The terminal device usually enters the RRC_IDLE state after being turned on or after RRC release. In the RRC_IDLE state, there is no RRC connection between the terminal device and the network device (such as the resident network device). The network device does not store the context of the terminal device, and there is no connection established between the network device and the core network for the terminal device. If the terminal device needs to enter the RRC_CONNECTED state from the RRC_IDLE state, it needs to initiate a RRC connection establishment process.

The RRC_INACTIVE state is a newly introduced state from the perspective of energy saving in order to reduce air interface signaling, quickly restore wireless connection and quickly restore data services. The RRC_INACTIVE state is a state between the connected state and the idle state. The terminal device has entered the RRC_CONNECTED state before, and then released the RRC connection, radio bearer and radio resources with the network device, but the network device saved the context of the terminal device in order to quickly restore the RRC connection. In addition, the connection established between the network device and the core network for the terminal device has not been released, that is, the user plane bearer and the control plane bearer between the RAN and the CN are still maintained, that is, there is a CN-NR connection.

The terminal device may switch between the above three RRC states. For example, the terminal device may suspend its session by entering the RRC_INACTIVE state from the RRC_CONNECTED state when there is no data transmission for a period of time, and may enter the RRC_CONNECTED state from the RRC_INACTIVE state when there is a demand for session transmission. In addition, the terminal device may also enter the RRC_IDLE state from the RRC_INACTIVE state or the RRC_CONNECTED state.

For a terminal device with infrequent data transmission, the terminal device may remain in the RRC_INACTIVE state to save power. Before the 3GPP release 16 (Rel-16), a terminal device in the RRC_INACTIVE state do not support data transmission, that is, the transmission of mobile original (MO) data and mobile terminated (MT) data is not supported. The MO data refers to a sending end of the data being the terminal device, and the message is transmitted from the terminal device to the network device. MO data may also be referred to as uplink data. The MT data refers to the sending end of the data being a network device, and the message is transmitted from the network device to the terminal device. MT data may also be referred to as downlink data.

When MO data or MT data arrives, the terminal device needs to restore RRC connection, thus entering the RRC_CONNECTED state. In the RRC_CONNECTED state, the terminal device may transmit MO data or MT data. After the transmission of MO data or MT data is completed, the terminal device releases the RRC connection and returns to the RRC_INACTIVE state.

In the above process, the terminal device needs to switch from the RRC_INACTIVE state to the RRC_CONNECTED state, and then switch from the RRC_CONNECTED state to the RRC_INACTIVE state. Switching between different RRC states can lead to increased power consumption of the terminal device. However, in some scenarios, the terminal device in the RRC_INACTIVE state needs to transmit some data with small data volume and low transmission frequency (which can be called small packet data). If the terminal device switches to the RRC_CONNECTED state and then transmits data, the signaling overhead required by the terminal device for RRC state switching may even be greater than the overhead required for transmitting these data, resulting in unnecessary power consumption and signaling overhead.

The small data packet in the embodiments of the present disclosure may be instant messaging message, heartbeat packet, periodic data, etc. The embodiment of the present disclosure does not specifically limit the source of the small data packet. As an example, the small data packet may be data from an application (APP) of a terminal device. For example, the small data packet may be data from communication service APPs (such as WhatsApp, QQ, WeChat, etc.), the heartbeat data packets from IM, email clients, or other APPs, push notifications from various applications, etc. As another example, the small data packet may be data from a non-terminal device application. For example, small data packets may come from wearable devices (such as periodic positioning information, etc.), sensor data (such as temperature information and pressure information sent by industrial wireless sensors periodically or in an event-triggered manner), smart meters and periodic meter readings specified in smart meter network transmission protocols (such as 3GPP TS 22.891), etc.

In order to reduce the power consumption of terminal device, the SDT scheme in the RRC_INACTIVE state is discussed in Release-17. In this scheme, the terminal device may perform small data transmission in the RRC_INAC-TIVE state, that is, there is no need to switch from the RRC_INACTIVE state to the RRC_CONNECTED state. The small data transmission of the embodiments of the present disclosure may include uplink small data transmission and downlink small data transmission. Hereinafter, the uplink small data transmission is mainly described.

In the RRC_INACTIVE state, the terminal device may perform SDT according to the resources configured by the network device. There are many ways for the terminal device to perform SDT, which is not specifically limited in the embodiments of the disclosure. For example, the terminal device may perform SDT during random access procedure. For another example, the terminal device may perform SDT based on configured grant (CG) resources. For a further example, the terminal device may perform SDT based on pre-allocated uplink resource (PUR). These situations are introduced respectively below.

The random access method may be two-step random access procedure or four-step random access procedure. For the two-step random access procedure, the terminal device may perform SDT in message A (MSGA). That is, MSGA of the two-step random access procedure may be used to carry data. For the four-step random access procedure, the terminal device may perform SDT in MSG3. In other words, MSG3 of the four-step random access procedure may be used to carry data.

In random access procedure, the resources of terminal device for SDT can be called RA-SDT resources.

Hereinafter, the two-step random access procedure and the four-step random access procedure are described with reference to FIG. 2 and FIG. 3, respectively.

Figure 2:
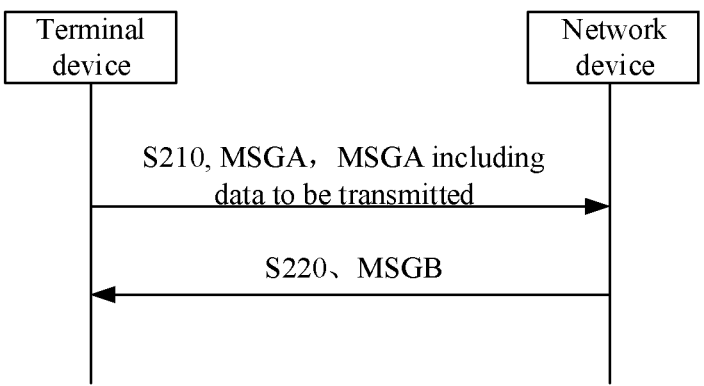
FIG. 2 is a schematic flowchart of performing SDT based on two-step random access procedure.

FIG. 2 shows a schematic flowchart of SDT performed in a two-step random access procedure.

In S210, a terminal device sends MSGA to a network device. The terminal device may send MSGA on the random access channel (RACH) resources configured by the network device. MSGA may carry data to be transmitted (or referred to as uplink data or MO data). If MSGA is used for SDT, the resources for transmitting MSGA may also be referred to as RA-SDT resources. For example, the RA-SDT resource may be a RACH resource, or a physical random access channel (PRACH) resource.

In S220, the network device sends MSGB to the terminal device. The MSGB may include a response to the data to be transmitted.

Figure 3:
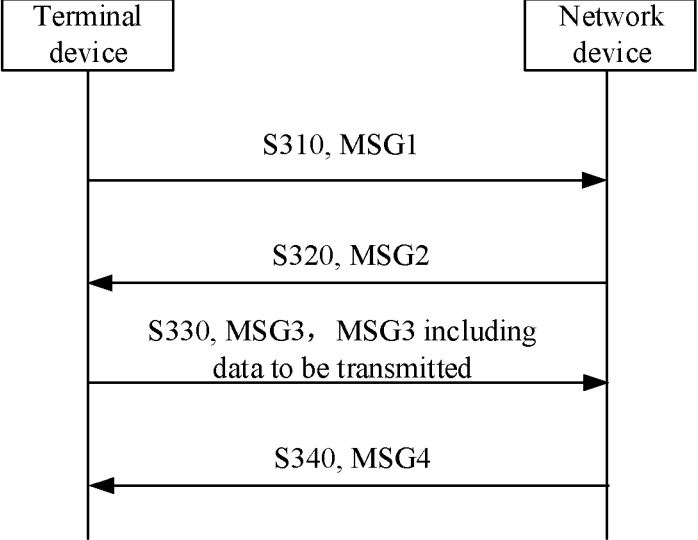
FIG. 3 is a schematic flowchart of performing SDT based on four-step random access procedure.

FIG. 3 shows a schematic flowchart of SDT performed in a four-step random access procedure.

In S310, a terminal device sends MSG1 to a network device. MSG1 carries a random access preamble.

In S320, the network device sends MSG2 to the terminal device. The MSG2 may also be called random access response (RAR). MSG2 may also include an uplink grant (UL grant), which is used to schedule the uplink resource indication of MSG3.

In S330, the terminal device may send MSG3 to the network device on the uplink grant scheduled by the network device. MSG3 carries data to be transmitted. If MSG3 is used for SDT, the resources for transmitting MSG3 (that is, the uplink grant scheduled by the network device) may also be called RA-SDT resources.

In S340, the network device sends MSG4 to the terminal device. The MSG4 may include a response to the data to be transmitted.

Configured grant may also be referred to as uplink grant free. Configured grant may refer to that the network device grants the terminal device by activating the uplink once, and the terminal device may always use the resources designated by the activated uplink grant (i.e. CG resources) for uplink transmission without receiving the deactivation instruction. In the embodiments of the present disclosure, the terminal device may use CG resources for SDT. CG resources used for SDT may also be called CG-SDT resources.

The type of configured grant may be, for example, CG type 1 or CG type 2. The configuration parameters of CG type 1 may be configured by RRC through signaling in higher layer. This high-level signaling may be, for example, IE ConfiguredGrantConfig. Parameters required by CG type 2 are also configured by IE ConfiguredGrantConfig, but resources of CG type 2 need to be activated and deactivated by downlink control information (DCI), and only resources activated by DCI may be used.

CG type 1 and CG type 2 may be distinguished according to the field rrc-ConfiguredUplinkGrant in IE ConfiguredGrantConfig. If the field rrc-ConfiguredDuplinkGrant is configured, the type of configured grant is CG type 1; if the field rrc-ConfiguredDuplinkGrant is not configured, the type of configured grant is CG type 2.

In some embodiments, the terminal device may perform SDT by using PUR resources. The PUR resource is a pre-configured resource for terminal device to send uplink data in disconnected state. The PUR resource may be a periodic resource, which may be preconfigured based on the first type of uplink grant (grant type 1). In the RRC_INACTIVE state, the terminal device may directly transmit data by using the reserved PUR resources.

Before conducting SDT, whether the terminal device meets the conditions for triggering SDT is determined. The terminal device may perform SDT only if the conditions for triggering SDT are met, that is, the terminal device may initiate the SDT process if the conditions for triggering SDT are met. If the conditions for triggering SDT are not met, the terminal device may initiate an RRC resume process. For example, the terminal device may switch from the RRC_INACTIVE state to the RRC_CONNECTED state to perform data transmission.

The conditions for triggering SDT may include one or more of the following: the data to be transmitted coming from a radio bearer that can trigger SDT, a data volume of the data to be transmitted being less than a pre-configured data volume threshold (hereinafter also referred to as a third preset threshold), a measurement result of downlink reference signal receiving power (RSRP) being greater than a pre-configured RSRP threshold, a valid SDT resource existing. The above conditions are introduced respectively below.

In some embodiments, the condition for triggering SDT is related to the radio bearer where the data to be transmitted is located. The embodiments of the present disclosure may determine, based on whether the data to be transmitted comes from a radio bearer that can trigger SDT, whether the terminal device meets the conditions for triggering SDT. If the data to be transmitted comes from a radio bearer that can trigger SDT, the terminal device meets the conditions for triggering SDT. If the data to be transmitted is not from a radio bearer that can trigger SDT, the terminal device does not meet the conditions for triggering SDT. The radio bearer may be, for example, a signaling radio bearer (SRB) or a data radio bearer (DRB).

In some embodiments, the condition for triggering SDT is related to the data volume of data to be transmitted. If the data volume of data to be transmitted is small, for example, the data to be transmitted is small packet data, the terminal device meets the conditions for triggering SDT. If the data volume of data to be transmitted is large, the terminal device does not meet the conditions for triggering SDT. According to the embodiments of the present disclosure, it is also possible to determine, by comparing the data volume of the data to be transmitted with a data volume threshold, whether the terminal device meets the conditions for triggering SDT. If the data volume of the data to be transmitted is less than the data volume threshold, the terminal device meets the condition of triggering SDT. If the data volume of the data to be transmitted is greater than or equal to the data volume threshold, the terminal device does not meet the conditions for triggering SDT. The data threshold may be pre-configured by the network device or pre-defined in the protocol.

In some embodiments, the condition for triggering SDT is related to the measurement result of downlink RSRP. If the measurement result of downlink RSRP is greater than an RSRP threshold, it indicates that the signal quality is good, and the terminal device meets the conditions for triggering SDT. If the measurement result of downlink RSRP is less than or equal to the RSRP threshold, it indicates that the signal quality is poor, and the terminal device does not meet the conditions for triggering SDT. The RSRP threshold may be pre-configured by the network device or pre-defined in the protocol.

In some embodiments, the condition for triggering SDT is related to whether there is a valid SDT resource. If there are valid SDT resources, the terminal device meets the conditions for triggering SDT, and the terminal device may use the valid SDT resources for data transmission. If there are no valid SDT resources, the terminal device does not meet the conditions for triggering SDT, and the terminal device has no available SDT resources for data transmission. SDT resources may be RA-SDT resources described above, and/ or CG-SDT resources.

If the terminal device is configured with both RA-SDT and CG-SDT resources, when determining there is a valid SDT resource, the terminal device may determine the validity of both RA-SDT resources and CG-SDT resources, or the terminal device may determine the validity of one SDT resource first, and then determine the validity of the other SDT resource. For example, the terminal device may first determine whether there is a valid RA-SDT resource, and then determine whether there is a valid CG-SDT resource. For another example, the terminal device may first determine whether there is a valid CG-SDT resource, and then determine whether there is a valid RA-SDT resource. The following description takes the case that the terminal device first determines whether there is a valid CG-SDT resource and then determines whether there is a valid RA-SDT resource as an example.

In some embodiments, whether CG-SDT resources are valid or not is related to whether there is a valid timing advance (TA). TA is related to the uplink synchronization of the terminal device. If TA is valid, it means that the terminal device is in the uplink synchronization state; if TA is invalid, it indicates that the terminal device is in an uplink out of synchronization state. According to the embodiments of the present disclosure, the validity of CG-SDT resources may be determined by determining whether there is a valid TA. If there is a valid TA, it may indicate that the CG-SDT resource is valid. If there is no valid TA, it may indicate that the CG-SDT resource is invalid.

The validity of TA is related to whether the TA timer (TAT) of SDT is running. The network device may configure a TA timer for the terminal device, and the TA timer may be used for the terminal device to determine the duration of uplink synchronization. If the TA timer is running, that is, the TA timer has not timed out, it indicates that there is a valid TA. If the TA timer is not running, that is, the TA timer has timed out, it indicates that there is no valid TA.

The TA timer may be started after the terminal device receives the RRC connection release message or the terminal device enters the RRC_INACTIVE state. The duration of the TA timer may be configured by the network device to the terminal device. For example, after receiving the RRC connection release message sent by the network device, the terminal device may enter the RRC_INACTIVE state according to the indication information in the RRC connection release message. The RRC connection release message may further include the configuration information of the SDT-TA timer, and the terminal device may start the SDT-TA timer based on the configuration information of the SDT-TA timer.

As mentioned above, the terminal device may transmit small data on SDT resources (such as CG-SDT resources or RA-SDT resources or PUR resources). However, regardless of the type of SDT resources, the amount of data it can carry is limited; if the SDT resources cannot carry all the data packets to be transmitted in the terminal device, there is no clear regulation on how the terminal device chooses the data packets to be transmitted.

Based on this, a method and a device for wireless communication are provided according to the embodiments of the present disclosure, which offers a clear solution for the selection of small data packets. Referring to FIG. 4, the solution of the embodiments of the present disclosure is introduced in detail.

Referring to FIG. 4, in S410, a terminal device uses SDT resources to send a first data packet to a network device. The first data packet is determined based on a first information. In other words, the terminal device may determine, based on the first information, the first data packet to be transmitted to the network device.

The data packet to be transmitted refers to the data packet that needs to be sent to the network device in the terminal device. The multiple data packets to be transmitted may include small data packets or non-small data packets. A small data packet may refer to a data packet with a data amount less than or equal to a pre-configured data amount threshold (or the third preset threshold). A non-small data packet may refer to a data packet with a data amount greater than the third preset threshold.

In the embodiments of the present disclosure, a channel type used for transmitting small data packets is not specifically limited. For example, the channel used to transmit small data packets may be dedicated control channel (DCCH) and dedicated traffic channel (DTCH). Since SRB1 and SRB2 are transmitted in DCCH and DRB is transmitted in DTCH, the small data packet of the embodiments of the present disclosure may come from one or more of SRB1, SRB2 and DRB. For another example, the channel used to transmit small data packets may be common control channel (CCCH). Since SRB0 is transmitted in CCCH, the small data packet of the embodiments of the present disclosure may come from SRB0.

Because DCCH and DTCH are related to the token bucket strategy of media access control (MAC) layer, the data streams carried in DCCH and DTCH are diverted according to a certain token bucket strategy. However, CCCH only carries on SRB0 and is only used in random access procedure, thus CCCH does not involve the token bucket algorithm of the MAC layer, that is, the data in CCCH does not have a related scheduling strategy. Consequently, the solution of the embodiments of the present disclosure is more suitable for scheduling data in CCCH.

The service types corresponding to the multiple data packets to be transmitted may be the same or different. For example, the multiple data packets to be transmitted may include data packets of different service types. The service type of the data packet may include one or more of the following: enhanced mobile broadband (eMBB), ultra reliable low latency communication (URLLC) and massive machine type communication (mMTC).

The first data packet may be determined based on the first information. The first information may include one or more of the following information: sizes of the data packets to be transmitted, allowed transmission latencies of the data packets to be transmitted, and waiting time of the data packets to be transmitted. The first data packet may be one data packet or multiple data packets, which is not specifically limited in the embodiment of the present disclosure.

In some embodiments, the first information may include the sizes of the data packets to be transmitted. The terminal device may select, based on the sizes of the data packets to be transmitted, a first data packet from multiple data packets to be transmitted. The smaller the size of the selected data packet, the more data packets may be carried on the SDT resources. Therefore, in order to transmit more data packets on the SDT resources, such as data packets of more services, the terminal device may first select smaller data packets for transmission.

As an example, the terminal device may sort the data packets to be transmitted according to the sizes of the data packets, such as sorting according to the order from large to small or from small to large. In case of selecting the first data packet, the terminal device may start selecting from the smallest data packet until the sum of the selected data packets reaches the upper limit of the SDT resources. In this case, the size of the first data packet may be less than or equal to the size of data packets in the data packets to be transmitted other than the first data packet. If the size of data packet 1 is smaller than the size of data packet 2, data packet 1 may be scheduled before the data packet 2.

For example, if there are K data packets $RB_i$ to be transmitted in the terminal device, the sizes of the K data packets to be transmitted are $L_i$, i=0, 1, . . . , K–1. The terminal device may sort the data packets according to the size of $L_i$, such as $L_0 \leq L_1 \leq \ldots \leq L_{K-1}$. In case of selecting the first data packet, the terminal device may schedule the data packets in sequence according to the above order until the sum of the scheduled data packets reaches the upper limit of the SDT resources. Or, until the remaining resources in the SDT resources cannot carry a data packet. For example, if $L_0+L_1+L_2+L_3$ is smaller than the size of the SDT resources and $L_0+L_1+L_2+L_3+L_4$ is larger than the size of the SDT resources, it means that the remaining resources in the SDT resources are not enough to carry data packet $RB_4$ after selecting data packets $RB_0$, $RB_1$, $RB_2$ and $RB_3$, and the terminal device may select data packets $RB_0$, $RB_1$, $RB_2$ and $RB_3$ as the first data packet.

As another example, the terminal device may select the first data packet based on whether the size of the data packet to be transmitted is less than a first preset threshold. The first preset threshold may be smaller than the third preset threshold, that is, the first preset threshold is smaller than the data amount threshold of small data packets. The terminal device may use data packets with a size smaller than the first preset threshold as the first data packet. Alternatively, the size of the first data packet is less than the first preset threshold. If the first data packet includes multiple data packets, the size of the respective data packet of the multiple data packets are smaller than the first preset threshold.

The first preset threshold may be predefined, or may be configured by the network device to the terminal device, or may be determined by the terminal device independently.

In some embodiments, the first information may include the allowed transmission latencies of the data packets to be transmitted. The allowable transmission latency may be understood as a transmission latency requirement of a data packet. The terminal equipment may select, based on the transmission latency allowed by the data packet to be transmitted, the first data packet from multiple data packets to be transmitted. In order to ensure the transmission latency requirements of data packets, the terminal device may first select the data packets with relatively low allowable transmission latency for transmission.

As an example, the terminal device may sort the data packets to be transmitted according to the allowable transmission latencies, such as sorting according to the order from large to small or from small to large. In case of selecting the first data packet, the terminal device may select from the data packet with the lowest latency requirement until the sum of the selected data packets reaches the upper limit of the SDT resources. In this case, the transmission latency allowed by the first data packet may be less than or equal to the transmission latency allowed by data packets other than the first data packet in the data packets to be transmitted. If the allowed transmission latency of packet 1 is 1 ms, and the allowed transmission latency of packet 2 is 0.5 ms, since the allowed transmission latency of packet 2 is less than the allowed transmission latency of packet 1, packet 2 may be scheduled before packet 1.

For example, if there are K data packets $RB_i$ to be transmitted in the terminal device, the sizes of the K data packets to be transmitted are $L_i$, and the allowed transmission latency of the k data packets to be transmitted is $T_i$, i=0, 1, . . . , K–1. The terminal device may sort the data packets according to the size of $T_i$, such as $T_0 \leq T_1 \leq \ldots \leq T_{K-1}$. In case of selecting the first data packet, the terminal device may schedule the packets in the above order until the sum of the scheduled packets reaches the upper limit of the SDT resources, or, until the remaining resources in the SDT resource cannot carry a data packet. For example, if $L_0+L_1+L_2+L_3$ is smaller than the size of the SDT resources and $L_0+L_1+L_2+L_3+L_4$ is larger than the size of the SDT resources, it indicates that after selecting data packets $RB_0$, $RB_1$, $RB_2$, and $RB_3$, the remaining resources in the SDT resources are insufficient to carry data packet $RB_4$, the terminal device may select data packets $RB_0$, $RB_1$, $RB_2$, and $RB_3$ as the first data packet.

As another example, the terminal device may select the first data packet based on whether the allowed transmission latency of the data packet to be transmitted is less than a fourth preset threshold. The terminal device may take the data packet whose allowed transmission latency is less than the fourth preset threshold as the first data packet. In other words, the allowed transmission latency of the first data packet is less than the fourth preset threshold. If the first data packet includes multiple data packets, the allowed transmission latencies of the multiple data packets are all less than the fourth preset threshold.

The fourth preset threshold may be predefined, or may be configured by the network device to the terminal device, or may be determined by the terminal device independently.

In some embodiments, the first information may include the time that the data packet to be transmitted has been waiting. The terminal device may select the first data packet from multiple data packets to be transmitted based on the waiting time of the data packet to be transmitted. In order to schedule the data packets reasonably, the terminal device may first select the data packets that have been waiting for a relatively long time for transmission.

As an example, the terminal device may sort the data packets to be transmitted according to the waiting time, such as sorting from large to small or from small to large. In case of selecting the first data packet, the terminal device may select from the data packet that has been waiting for the longest time until the sum of the selected data packets reaches the upper limit of the SDT resources. In this case, the waiting time of the first data packet may be greater than or equal to the waiting time of data packets other than the first data packet in the data packet to be transmitted. If packet 1 has been waiting for 0.5 ms and packet 2 has been waiting for 0.3 ms, since packet 1 has been waiting longer than packet 2, packet 1 may be scheduled before packet 2.

For example, if there are K data packets $RB_i$ to be transmitted in the terminal device, the sizes of the K data packets to be transmitted are $L_i$, and the waiting time of the K data packets to be transmitted is $W_i$, i=0, 1, . . . , K−1. The terminal device may sort the data packets according to the size of $W_i$, such as $W_0 \geq W_1 > . . . \geq W_{K-1}$. In case of selecting the first data packet, the terminal device may schedule the data packets in sequence according to the above order until the sum of the scheduled data packets reaches the upper limit of the SDT resources, or until the remaining resources in the SDT resources cannot carry one data packet. For example, if $L_0+L_1+L_2+L_3$ is smaller than the size of the SDT resources and $L_0+L_1+L_2+L_3+L_4$ is larger than the size of the SDT resources, it means that the remaining resources in the SDT resources are not enough to carry data packet $RB_4$ after selecting data packets $RB_0$, $RB_i$, $RB_2$ and $RB_3$, and the terminal device may select data packets $RB_0$, $RB_i$, $RB_2$ and $RB_3$ as the first data packet.

As another example, the terminal device may select the first data packet based on whether the waiting time of the data packet to be transmitted is less than a fifth preset threshold. The terminal device may take the data packet whose waiting time is less than the fifth preset threshold as the first data packet. In other words, the waiting time of the first data packet is less than the fifth preset threshold. If the first data packet includes multiple data packets, the waiting time of the multiple data packets are all less than the fifth preset threshold.

The fifth preset threshold may be predefined, or may be configured by the network device to the terminal device, or may be determined by the terminal device independently.

In addition to the information described above, the first information may further include other information, such as quality of service (QoS) information or QoS class identifier (QCI). QCI is a parameter used by the system to represent the transmission characteristics of service data packets. The numerical range of QCI may be from 1 to 9. QCI with different values corresponds to different resource types, different priorities, different latencies and different packet loss rates. In other words, in the embodiments of the present disclosure, the first data packet may also be determined according to one or more of the resource type of the transmission data packet, the priority of the data packet, the latency of the data packet, and the packet loss rate of the data packet.

It may be understood that the first information mentioned above may be implemented separately or in combination with each other, and the embodiments of the present disclosure do not specifically limit this.

As an example, the first information may include the size of the data packet to be transmitted and the allowed transmission latency of the data packet to be transmitted. The terminal device is configured to select the first data packet based on the size of the data packet to be transmitted and the transmission latency allowed by the data packet to be transmitted. For example, the terminal device may select a packet with a relatively smaller size and relatively lower allowable transmission latency as the first data packet, so as to balance the scheduling of packets of different services.

As another example, the first information may include the size of the data packet to be transmitted and the time that the data packet has been waiting. The terminal device may select the first data packet based on the size of the data packet to be transmitted and the time the data packet has been waiting for. The terminal device may select a packet with a relatively smaller size and relatively longer waiting time as the first data packet, so as to balance the scheduling of data packets of different services.

As another example, the first information may include the allowed latency of the data packet and the time that the data packet has been waiting. The terminal device may select the first data packet based on the allowed latency of the data packet and the time the data packet has been waiting for. The terminal device may select the data packet with relatively lower allowable transmission latency and relatively longer waiting time as the first data packet, so as to balance the scheduling of data packets of different services.

As another example, the first information may include the size of the data packet to be transmitted, the allowed transmission latency of the data packet to be transmitted, and the waiting time of the data packet to be transmitted. The terminal device may select the first data packet based on the size of the data packet to be transmitted, the allowed transmission latency of the data packet to be transmitted and the waiting time of the data packet to be transmitted. The terminal device may select the data packet with relatively smaller size, relatively lower allowed transmission latency and relatively longer waiting time as the first data packet, so as to balance the scheduling of data packets of different services.

Taking the first information including the following contents as an example, namely the size of the data packet to be transmitted, the allowable transmission latency of the data packet to be transmitted, and the waiting time of the data packet to be transmitted, the method of determining the first data packet is illustrated.

In some embodiments, a first parameter corresponding to the first data packet is less than or equal to the first parameter corresponding to data packets other than the first data packet in the multiple data packets to be transmitted, and the first parameter is determined based on the first information. Or, the first data packet may be determined based on the first information.

For example, the terminal device may determine the first parameter based on the first information, and then select the first data packet based on the first parameter.

The first parameter may satisfy one or more of the following conditions: the first parameter being proportional to a size of a data packet to be transmitted, the first parameter being proportional to an allowed transmission latency of a data packet to be transmitted, and the first parameter being inversely proportional to a waiting time of a data packet to be transmitted.

The first parameter is proportional to the size of the data packet to be transmitted, that is, the smaller the data packet to be transmitted, the smaller the first parameter corresponding to the data packet, and the larger the data packet to be transmitted, the larger the first parameter corresponding to the data packet.

The first parameter is proportional to the allowed transmission latency of the data packet to be transmitted, that is, the smaller the allowed transmission latency of the data packet to be transmitted, the smaller the first parameter corresponding to the data packet, and the larger the allowed transmission latency of the data packet to be transmitted, the larger the first parameter corresponding to the data packet.

The first parameter is inversely proportional to the waiting time of the data packet to be transmitted, that is, the longer the data packet to be transmitted has been waiting, the smaller the first parameter corresponding to the data packet, and the shorter the waiting time of the data packet to be transmitted, the larger the first parameter corresponding to the data packet.

In case of selecting the first data packet, the terminal device may select the first data packet based on the size of the first parameter. For example, the terminal device may select a data packet with a relatively smaller first parameter as the first data packet. The terminal device may start selecting from the data packet with the smallest first parameter until reaching the upper limit of the SDT resources.

In the embodiments of the present disclosure, the calculation manner of the first parameter is not specifically limited, as long as the first parameter meets the above conditions. For example, the first parameter may be expressed by the following formula:

$$K_i = L_i \Big/ \left( 1 + P * \frac{W_i}{a} * \frac{b}{T_i} \right) \qquad \text{formula (1)}$$

In the formula, $K_i$ represents the first parameter corresponding to the ith data packet, $L_i$ represents the size of the ith data packet, $W_i$ represents the waiting time of the ith data packet, $T_i$ represents the transmission latency of the ith data packet, P represents a weight, and a and b are constants.

In case of selecting the first data packet, the terminal device may choose the data packet with the smallest $K_i$ as the first data packet. For example, the terminal device may choose $$K_j = \min \sum_{i=0}^{k-1} (K_i)$$

as the first data packet.

In the above formula (1), the first parameter $K_i$ is directly proportional to $L_i$, inversely proportional to $$\frac{W_i}{a}$$

and inversely proportional to $$\frac{b}{T_i}.$$

Therefore, the smaller $L_i$ is, the smaller $K_i$ is; the greater $W_i$, the smaller $K_i$; the smaller the $T_i$, the smaller the $K_i$.

In formula (1), the value of a may be $W_{max}$, and $W_{max}$ represents the longest waiting time among the waiting times in multiple data packets to be transmitted. For example, if data a has been waiting for the longest time among multiple data to be transmitted, the waiting time of data a may be taken as $W_{max}$. The value of b may be $T_{min}$, where $T_{min}$ represents the minimum transmission latency among the allowed transmission latencies of multiple data packets to be transmitted. For example, among multiple data packets to be transmitted, the transmission latency allowed by data b is the smallest, so the transmission latency allowed by data b may be regarded as $T_{min}$. Thus, the formula (1) may be transformed into the following formula (2):

$$K_i = L_i \Big/ \left( 1 + P * \frac{W_i}{W_{max}} * \frac{T_{min}}{T_i} \right) \qquad \text{formula (2)}$$

In the above formula (2), the first parameter $K_i$ is directly proportional to $L_i$, inversely proportional to $$\frac{W_i}{W_{max}}$$

and inversely proportional to $$\frac{T_{min}}{T_i}.$$

Using $$\frac{W_i}{W_{max}} \text{ and } \frac{T_{min}}{T_i}$$

as variables may keep the values of $$\frac{W_i}{W_{max}} \text{ and } \frac{T_{min}}{T_i}$$

within a certain range, thus avoiding the occurrence of extreme values for the calculated first parameter $K_i$.

In formula (1) and formula (2), the weight P may adjust the influence of the transmission latency allowed by the data packet and the waiting time of the data packet on the first parameter $K_i$. The larger the value of P, the greater the influence of the allowed transmission latency of the data packet and the waiting time of the data packet on $K_i$; The smaller the value of P, the smaller the influence of the allowed transmission latency of the data packet and the waiting time of the data packet on $K_i$.

The value of P may be an integer or a fraction. For example, the value of P may be greater than 1, less than 1, or equal to 1. The P value may be predefined, configured by the network device for the terminal device, or determined independently by the terminal device. The P value may be flexibly adjusted according to actual needs. For example, if in the last scheduling, many packets cannot be scheduled after timeout, the P value may be increased in the next scheduling.

The above formulas are only for example and does not limit the scheme of the embodiments of the present disclosure. For example, the first parameter may also be determined based on the following formula:

$$K_i = L_i \Big/ \left( 1 + P1 * \frac{W_i}{a} + P2 * \frac{b}{T_i} \right) \qquad \text{formula (3)}$$

In the formula (3), P1 represents a weight of the waiting time of the data packet, and P2 represents a weight of the allowed transmission latency of the data packet. The larger the P1 value, the greater the influence of the waiting time of the data packet on $K_i$; the smaller the P2 value, the smaller the influence of the allowed transmission latency of the data packet on $K_i$.

In the RRC_INACTIVE state, when the service data of the terminal device cannot be completely transmitted through one-time granted resource blocks (TB burst), the remaining data can be continuously transmitted after the terminal device enters the RRC_CONNECTED state. Therefore, in the embodiments of the present disclosure, different scheduling may be performed based on different sizes of the data packets.

In some embodiments, data packets may be divided based on their sizes. For example, a size of a data packet may be divided into three levels using a first preset threshold and a third preset threshold. The first preset threshold is less than the third preset threshold. The third preset threshold is used to limit the maximum data packet that can be transmitted on the SDT resources.

If a size of a data packet is less than or equal to the first preset threshold, the data packet to be scheduled may be determined according to the size of the first parameter. The calculation formula of the first parameter and the mode of scheduling according to the first parameter may be referred to the previous description.

If a size of a data packet is greater than the first preset threshold and less than or equal to the third preset threshold, the transmission mode of the data packet may be determined according to the latency sensitivity of the data packet. If the data packet is not sensitive to latency, and if the allowed transmission latency of the data packet is greater than a second preset threshold, the terminal device may cache the data packet. Or the terminal device may be retained in the RRC_INACTIVE state, wait for subsequent transmission opportunities to arrive before transmitting the data packet. Subsequent transmission opportunities may be, for example, PUR resources in the next cycle or CG-SDT resources dynamically scheduled by network equipment next time. If the data packet is sensitive to latency and the allowed transmission latency of the data packet is less than or equal to the second preset threshold, the terminal device may enter the RRC_CONNECTED state and transmit the data packet according to the normal flow.

If a size of a data packet is greater than the third preset threshold, the RRC recovery process may be started regardless of whether the data packet is sensitive to latency. The terminal device enters the RRC_CONNECTED state and transmits the data packet according to the normal flow.

The above SDT resources may be RA-SDT resources, CG-SDT resources, or PUR resources. In case of conducting small data transmission, the terminal device may use RA-SDT resources, CG-SDT resources or PUR resources.

In some embodiments, if the terminal device has a valid timing advance (TA), the terminal device may directly perform "dynamic scheduling-free" data transmission by using the PUR resources reserved by the network device. Here, PUR resources are pre-configured based on grant type 1. If the terminal device does not have a valid TA, the terminal device may perform random access first, and after the random access is completed, the terminal device may receive grant instructions and other parameters dynamically scheduled by the network device, and may then transmit small data packets based on the grant of dynamic scheduling.

Referring to FIG. 5 and FIG. 6, the wireless communication method according to the embodiments of the present disclosure is described in detail.

Referring to FIG. 5, SDT resources may be RA-SDT resources. RA-SDT resources may also become PRACH resources. The terminal device may send a small data packet to the network device in the process of random access.

In S510, the terminal device sends MSG A to a network device. the MSG A may carry an RRC resume request and a small data packet. In other words, the terminal device may combine RRC resume signaling and the small data packet, and send them to the network device at the same time. The small data packet is an uplink data packet.

In S520, the network device sends MSG B to the terminal device. The MSG B carries an RRC conflict detection signaling and a small data packet. In other words, the network device may combine the RRC conflict detection signaling and the small data packet, and send them to the terminal device at the same time. The small data packet is a downlink data packet.

In some embodiments, the terminal device is configured to perform small data transmission in random access procedure and in an RRC recovery process, so as to make the terminal device transmit more small data in the RRC_INACTIVE state, thus avoiding the terminal device from frequently entering the RRC_CONNECTED state and reducing signaling overhead.

In S610, a terminal device sends a MSGA to a network device. The MSGA may carry an RRC resume request and a small data packet. In other words, the terminal device may combine the RRC resume signaling and the small data packet, and send them to the network device at the same time.

In S620, the network device sends a MSGB to the terminal device. The MSGB carries an RRC conflict detection signaling and a small data packet. In other words, the network device may combine the RRC conflict detection signaling and the small data packet, and send them to the terminal device at the same time.

In S630, after completing the random access, the terminal device initiates the RRC resume process. The terminal device may send the small data packet and the RRC resume signaling to the network device.

In S640, after receiving the RRC resume signaling, the network device may dynamically schedule grant parameters to the terminal device based on the identity (ID) information of the terminal device. For example, the network device may send a physical downlink control channel (PDCCH) to the terminal device, and the PDCCH is used to indicate uplink grant.

In S650, the terminal device may transmit small data packets on the uplink grant.

In S660, the terminal device releases the RRC connection, and returns to the RRC_INACTIVE state.

When it is determined that the terminal device is about to leave the RRC_CONNECTED state, the network device may send an RRC release message to the terminal device to instruct the terminal device to leave the RRC_CONNECTED state. The RRC release message may instruct the terminal device to enter the RRC_INACTIVE state or the RRC_IDLE state. In the RRC_INACTIVE state, the terminal device may monitor the short messages transmitted by DCI through paging radio network temporary identifier (P-RNTI), use 5G serving-temporary mobile subscription identifier (5G-S-TMSI) to monitor the CN paging channel, and use full inactive-radio network temporary identity (fullI-RNTI) to run the paging. The terminal device may also perform neighbor cell measurement and cell (re-)selection, periodically update the notification area based on RAN, and acquire system information and may send a scheduling request (SI) request (if configured) when moving out of the configured notification area based on RAN. In addition, the terminal device may also record available measurements and record the location and time of the measurement configuration of UE.

In the RRC_INACTIVE state, the terminal device retains the working context in the last serving cell and is allowed to move within a certain range without informing the network device which cell it is in. The network side retains the next generation (NG) interface connection, and both the network side and the UE retain the non-access stratum (NAS) signaling connection. Therefore, UE only needs to perform the resume process to restore signaling and data bearer, and then may directly send or receive data.

In the RRC_INACTIVE state, if the last serving network device receives downlink (DL) data from the user plane function (UPF) or DL signal from the access and mobility management function (AMF) (except UE release command and reset message), or if the NG-RAN station of the last service receives the UE release command message from AMF, the network device or the NG-RAN station may reply with the UE context release complete message. The last gNB station that provides services to the terminal device maintains the context of the terminal device, which is connected to AMF and UPF.

Figure 7:
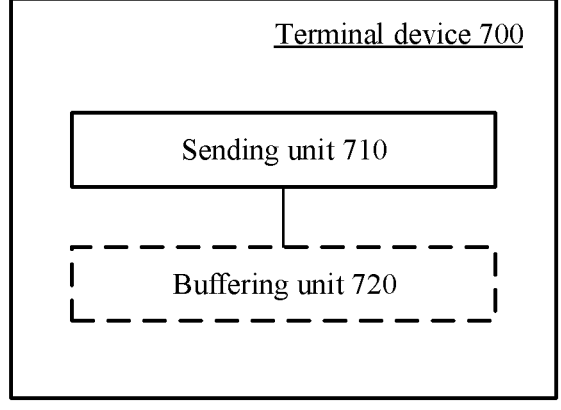
FIG. 7 is a schematic structural diagram of a terminal device provided by an embodiment of the present disclosure.
Figure 8:
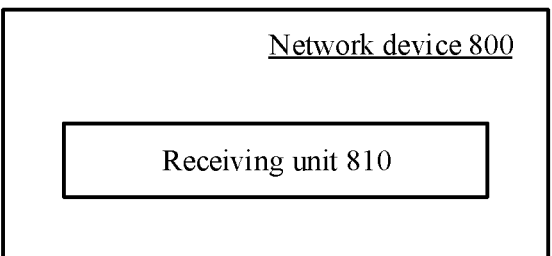
FIG. 8 is a schematic structural diagram of a network device provided by an embodiment of the present disclosure.
Figure 9:
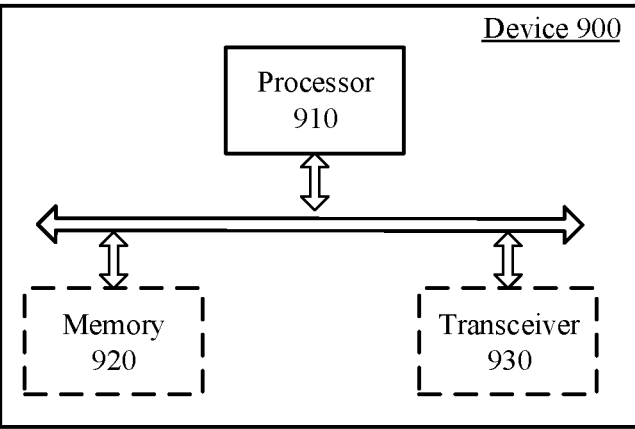
FIG. 9 is a schematic structural diagram of a communication device provided by an embodiment of the present disclosure.

Referring to FIG. 1 to FIG. 6, the method embodiments of the present disclosure are described in detail. Referring to FIG. 7 to FIG. 9, the device embodiments of the present disclosure are described in detail. It should be understood that the illustration of the method embodiments and the illustration of the device embodiments correspond to each other, and therefore, the parts not described in detail may refer to the previous method embodiments.

FIG. 7 is a schematic structural diagram of a terminal device provided by an embodiment of the present disclosure. The terminal device shown in FIG. 7 may be any of the terminal devices described above. The terminal device 700 includes a sending unit 710.

The sending unit 710 is configured to send, by using SDT resources, a first data packet among data packets to be transmitted to a network device. The first data packet is determined based on first information. The first information includes one or more of the following information: sizes of the data packets to be transmitted, allowable transmission latencies of the data packets to be transmitted, waiting time of the data packets to be transmitted.

In some embodiments, a first parameter corresponding to the first data packet is less than or equal to a first parameter corresponding to data packets other than the first data packet in the data packets to be transmitted, the first parameter is determined based on the first information, and the first parameter satisfies one or more of the following conditions: the first parameter being proportional to the size of the data packet to be transmitted, the first parameter being proportion to the allowed transmission latency of the data packet to be transmitted, the first parameter being inversely proportional to the waiting time of the data packet to be transmitted.

In some embodiments, a size of the first data packet is less than or equal to a first preset threshold, and the first preset threshold is less than a data amount threshold of a small data packet.

In some embodiments, the terminal device 700 further includes: a buffering unit 720, configured to buffer a second data packet among the data packets to be transmitted in response to a transmission latency allowed by the second data packet being greater than a second preset threshold, a size of the second data packet is greater than the first preset threshold.

In some embodiments, the SDT resources include one or more of the following resources: physical random access channel (PRACH) resources, configured grant (CG) resources, uplink pre-configuration resources (PUR).

FIG. 8 is a schematic structural diagram of a network device provided by an embodiment of the present disclosure. The network device shown in FIG. 8 may be any of the network devices described above. The network device 800 includes a receiving unit 810.

The receiving unit 810 is configured to receive, by using SDT resources, a first data packet among data packets to be transmitted sent by a terminal device. The first data packet is determined based on first information. The first information includes one or more of the following information: sizes of the data packets to be transmitted, allowable transmission latencies of the data packets to be transmitted, waiting time of the data packets to be transmitted.

In some embodiments, a first parameter corresponding to the first data packet is less than or equal to a first parameter corresponding to data packets other than the first data packet in the data packets to be transmitted, the first parameter is determined based on the first information, and the first parameter satisfies one or more of the following conditions: the first parameter being proportional to the size of the data packet to be transmitted, the first parameter being proportion to the allowed transmission latency of the data packet to be transmitted, the first parameter being inversely proportional to the waiting time of the data packet to be transmitted.

In some embodiments, a size of the first data packet is less than or equal to a first preset threshold, and the first preset threshold is less than the data amount threshold of a small data packet.

In some embodiments, the SDT resources include one or more of the following resources: physical random access channel (PRACH) resources, configured grant (CG) resources, upstream pre-configured resources (PUR).

FIG. 9 is a schematic structural diagram of a device according to an embodiment of the present disclosure. The dashed line in FIG. 9 indicates that the unit or module is optional. The device 900 may be used to implement the method described in the above method embodiments. The device 900 may be a chip, a terminal device or a network device.

The device 900 may include one or more processors 910. The processor 910 may support the device 900 to implement the method described in the previous method embodiments. The processor 910 may be a general-purpose processor or a dedicated processor. For example, the processor may be a central processing unit (CPU). Alternatively, the processor may also be other general processors, digital signal processor (DSP), application specific integrated circuits (ASIC), field programmable gate array (FPGA) or other programmable logic devices, discrete gate or transistor logic devices, discrete hardware components, etc. The general-purpose processor may be a microprocessor or the processor may be any conventional processor, etc.

The device 900 may further include one or more memories 920. A program is stored on the memory 920, which can be executed by the processor 910, so that the processor 910 performs the method described in the above method embodiments. The memory 920 may be independent of or integrated in the processor 910.

The device 900 may further include a transceiver 930. The processor 910 may communicate with other devices or chips through the transceiver 930. For example, the processor 910 may transmit and receive data with other devices or chips through the transceiver 930.

The embodiments of the present disclosure further provide a computer-readable storage medium for storing a program. The computer-readable storage medium may be applied to a terminal device or a network device provided by the embodiments of the present disclosure, and the program causes a computer to implement the method performed by the terminal device or the network device in various embodiments of the present disclosure.

The embodiments of the present disclosure further provide a computer program product, which includes a program. The computer program product may be applied to the terminal device or the network device provided in the embodiments of the present disclosure, and the program causes a computer to implement the methods performed by the terminal device or the network device in various embodiments of the present disclosure.

The embodiments of the present disclosure further provide a computer program. The computer program may be applied to the terminal device or the network device provided in the embodiments of the present disclosure, and the computer program causes a computer to implement the methods performed by the terminal device or the network device in various embodiments of the present disclosure.

It should be understood that in the embodiments of the present disclosure, "B corresponding to A" indicates that B is associated with A, and B may be determined based on A. But it should also be understood that determining B based on A does not mean determining B solely based on A, and B may also be determined based on A and/or other information.

It should be understood that the term "and/or" herein is only a description of the association relationship between related objects, indicating that there may be three types of relationships, for example, A and/or B may represent the presence of A alone, the presence of A and B simultaneously, and the presence of B alone. In addition, the character '/' herein generally indicates that the associated object is an 'or' relationship.

It should be understood that in various embodiments of the present disclosure, the size of the serial number of the above-mentioned processes does not mean the order of execution, and the order of execution of each process should be determined according to its function and internal logic, and should not constitute any limitation on the implementation process of the embodiments of the present disclosure.

In several embodiments provided by the present disclosure, it should be understood that the disclosed systems, devices and methods may be realized in other ways. For example, the device embodiments described above are only schematic. For example, the division of the units is only a logical function division, and there may be another division method in actual implementation, for example, multiple units or components may be combined or integrated into another system, or some features may be ignored or not implemented. On the other hand, the mutual coupling or direct coupling or communication connection shown or discussed may be indirect coupling or communication connection through some interfaces, devices or units, which may be electrical, mechanical or other forms.

The units described as separate components may or may not be physically separated, the components displayed as units may be or may not be physical units, which may be located in one place or distributed across multiple network units. Some or all of the units may be selected according to actual needs to achieve the objective of the embodiments.

In addition, each functional unit in various embodiments of the present disclosure may be integrated into one processing unit, or each unit may exist physically alone, or two or more units may be integrated into one unit.

In the above embodiments, the disclosed systems, devices and methods may be realized in whole or in part by software, hardware, firmware or any combination thereof. When implemented in software, it may be fully or partially implemented in the form of a computer program product. The computer program product includes one or more computer instructions. When loading and executing the computer program instructions on a computer, all or part of the processes or functions described in the embodiments of the present disclosure are generated. The computer may be a general-purpose computer, a special-purpose computer, a computer network, or other programmable devices. The computer instructions may be stored in a computer-readable storage medium or transmitted from one computer-readable storage medium to another computer-readable storage medium. For example, the computer instructions may be transmitted from one website, computer, server or data center to another website, computer, server or data center by wired (such as coaxial cable, optical fiber, digital subscriber line (DSL)) or wireless (such as infrared, wireless, microwave, etc.). The computer-readable storage medium may be any available medium that the computer can read, or a data storage device such as a server or data center that integrated by one or more available media. The available medium may be a magnetic medium (e.g., floppy disk, hard disk, magnetic tape), an optical medium (e.g., digital video disc (DVD)) or a semiconductor medium (e.g., solid state disk (SSD)) and the like.

The above are only the embodiments of the present disclosure, but the protection scope of the present disclosure is not limited to this. Any person familiar with the technical field can easily think of changes or substitutions within the technical scope disclosed in this disclosure, which should be covered by the protection scope of this disclosure. Therefore, the protection scope of this disclosure should be based on the protection scope of the claims.

What is claimed is:

1. A method for wireless communication, comprising:
sending, at a terminal device and by using small data transmission (SDT) resources, data to a network device, wherein using the SDT resources to send the data is determined based on first information;
wherein the first information includes one or more of the following information:
a size of the data,
an allowable transmission latency of the data, or
a waiting time of the data; and
wherein using the SDT resources to send the data is further determined based on a measurement result of downlink reference signal receiving power (RSRP) being greater than a pre-configured RSRP threshold, and wherein the method further comprises:
buffering, at the terminal device, a second data block among data blocks to be transmitted in response to a transmission latency allowed by the second data block being greater than a second preset threshold, the second data block having a size greater than a first preset threshold.

2. The method according to claim 1, wherein the data comprise a plurality of data packets, and the method further comprises:
for each of the plurality of data packets, determining a parameter of the respective data packet based on at least one of the following: a size of the data packet, an allowed transmission latency of the data packet, or a
waiting time of the data packet;
determining a first data packet among the plurality of data
packets, wherein the parameter of the first data packet
is less than or equal to a parameter of other data packets
in the plurality of data packets; and
transmitting the first data packet prior to transmitting
other data packets in the plurality of data packets.

3. The method according to claim 2, wherein the param-
eter increases with an increase of the size of the data packet,
the parameter increases with an increase of the allowed
transmission latency of the data packet, and the parameter
decrease with an increase of a waiting time of the data
packet.

4. The method according to claim 1, wherein the SDT
resources include one or more of the following resources:
physical random access channel (PRACH) resources, con-
figured grant (CG) resources, or upstream pre-configured
resources (PUR).

5. The method according to claim 4, wherein the CG
resources are configured by radio resource control (RRC)
signaling.

6. A method for wireless communication, comprising:
receive, at a network device and by using small data
transmission (SDT) resources, data sent by a terminal
device, wherein using the SDT resources to send the
data is determined based on first information;
wherein the first information includes one or more of the
following information:
a size of the data,
an allowable transmission latency of the data, or
a waiting time of the data; and
wherein the data comprise a plurality of data packets, and
wherein a first data packet among the plurality of data
packets is selected based on a parameter of each of the
plurality of data packets, and wherein the parameter of
the respective data packet is determined based on at
least one of the following: a size of the data packet, an
allowed transmission latency of the data packet, or a
waiting time of the data packet; and wherein the
parameter increases with an increase of the size of the
data packet, the parameter increases with an increase of
the allowed transmission latency of the data packet, and
the parameter decrease with an increase of a waiting
time of the data packet.

7. The method according to claim 6, wherein using the
SDT resources to send the data is further determined based
on a measurement result of downlink reference signal
receiving power (RSRP) being greater than a pre-configured
RSRP threshold.

8. The method according to claim 6, wherein the SDT
resources include one or more of the following resources:
physical random access channel (PRACH) resources, con-
figured grant (CG) resources, or upstream pre-configured
resources (PUR).

9. The method according to claim 8, wherein the CG
resources are configured by radio resource control (RRC)
signaling.

10. An apparatus, comprising:
at least one processor;
one or more non-transitory computer-readable storage
media coupled to the at least one processor and storing
programming instructions for execution by the at least
one processor, wherein the programming instructions,
when executed, cause the apparatus to perform opera-
tions comprising:
sending, by using small data transmission (SDT)
resources, data to a network device, wherein using
the SDT resources to send the data is determined
based on first information;
wherein the first information includes one or more of
the following information:
a size of the data,
an allowable transmission latency of the data, or
a waiting time of the data; and
wherein using the SDT resources to send the data is
further determined based on a measurement result of
downlink reference signal receiving power (RSRP)
being greater than a pre-configured RSRP threshold,
and wherein the operations further comprise:
buffering a second data block among data blocks to be
transmitted in response to a transmission latency
allowed by the second data block being greater than
a second preset threshold, the second data block
having a size greater than a first preset threshold.

11. The apparatus according to claim 10, wherein the data
comprise a plurality of data packets, and the operations
further comprise:
for each of the plurality of data packets, determining a
parameter of the respective data packet based on at
least one of the following: a size of the data packet, an
allowed transmission latency of the data packet, or a
waiting time of the data packet;
determining a first data packet among the plurality of data
packets, wherein the parameter of the first data packet
is less than or equal to a parameter of other data packets
in the plurality of data packets; and
transmitting the first data packet prior to transmitting
other data packets in the plurality of data packets.

12. The apparatus according to claim 11, wherein the
parameter increases with an increase of the size of the data
packet, the parameter increases with an increase of the
allowed transmission latency of the data packet, and the
parameter decrease with an increase of a waiting time of the
data packet.

13. The apparatus according to claim 10, wherein the SDT
resources include one or more of the following resources:
physical random access channel (PRACH) resources, con-
figured grant (CG) resources, or upstream pre-configured
resources (PUR).

14. The apparatus according to claim 13, wherein the CG
resources are configured by radio resource control (RRC)
signaling.

* * * * *